UNITED STATES PATENT OFFICE.

GEORGE LITTLE, OF RUTHERFORD PARK, NEW JERSEY.

IMPROVEMENT IN PREPARING PAPER FOR AUTOMATIC TELEGRAPHY AND IN RECOVERING CHEMICALS FROM WASTE PAPER.

Specification forming part of Letters Patent No. 129,841, dated July 23, 1872.

*To all whom it may concern:*

Be it known that I, GEORGE LITTLE, of Rutherford Park, in the county of Bergen and State of New Jersey, have invented an Improvement in Paper for Chemical Telegraphs; and the following is declared to be a correct description of the same.

Paper has been prepared for telegraphic purposes with iodide of potassium and starch, in proportion of about one part of iodide to twenty of starch-paste, and forty parts of water. This solution is sensitive, but the paper is liable to stick together and tear; the surface is liable to crumble or scale off when dry; the marks produced thereon soon fade; and a more powerful current of electricity is necessary to make the marks than is required by my process.

By very extended and careful experiment I have discovered that by decreasing the proportion of starch the characters are rendered more legible, and that there is a point at which the mark will be the most clear and durable, and at the same time the risk of the paper sticking or the surface scaling will be entirely avoided. I have discovered that the best effects are produced by mixing together about one hundred and ninety-two parts, by weight, of water with forty-eight parts of iodide of potassium and four parts of starch.

I compound the same in the following manner: The iodide of potassium is mixed in sufficient of the water to dissolve it thoroughly, and the starch is carefully mixed in cold water and then boiled in sufficient of the water to make a very thin mixture, that is either to be strained carefully through a sieve or piece of muslin to detain any small lumps or particles of glutinous matter, or else these are allowed to subside and the liquid decanted. The materials are then mixed together, and the liquid is ready for the paper to be immersed therein. Care should be taken that the water is pure, and also that the paper is free from all foreign substances, such as chloride of lime, &c., because this or other foreign matter is liable to discolor the paper.

The paper saturated with the solution, prepared in substantially the manner before described, will receive a mark from a very feeble electric current, and there will be no risk of discoloration, sticking, or injury to the paper while in use.

In order to prevent the waste of the chemical substances employed in the preparation of the paper, I extract the same by boiling the strips in water and then squeezing the paper-pulp to express the liquid, and then recover the iodide of potassium by evaporation, or otherwise, so as to save the expense of the same and thus economize the automatic-telegraph system.

The paper-pulp may also be employed in the manufacture of paper. If the salts are not entirely recovered by boiling or washing, the paper may be subjected to treatment a second time. This paper is very sensitive; hence can be employed for general automatic telegraphy, or with submarine cables, condensers, &c.

I claim as my invention—

1. The solution prepared of the materials and in about the proportions specified, for saturating paper for chemical telegraphs, as and for the purposes set forth.

2. The mode herein specified of recovering and utilizing the chemical substances employed in telegraphic paper, as set forth.

Signed by me this 24th day of May, A. D. 1872.

GEORGE LITTLE.

Witnesses:
HAROLD SERRELL,
GEO. T. PINCKNEY.